UNITED STATES PATENT OFFICE.

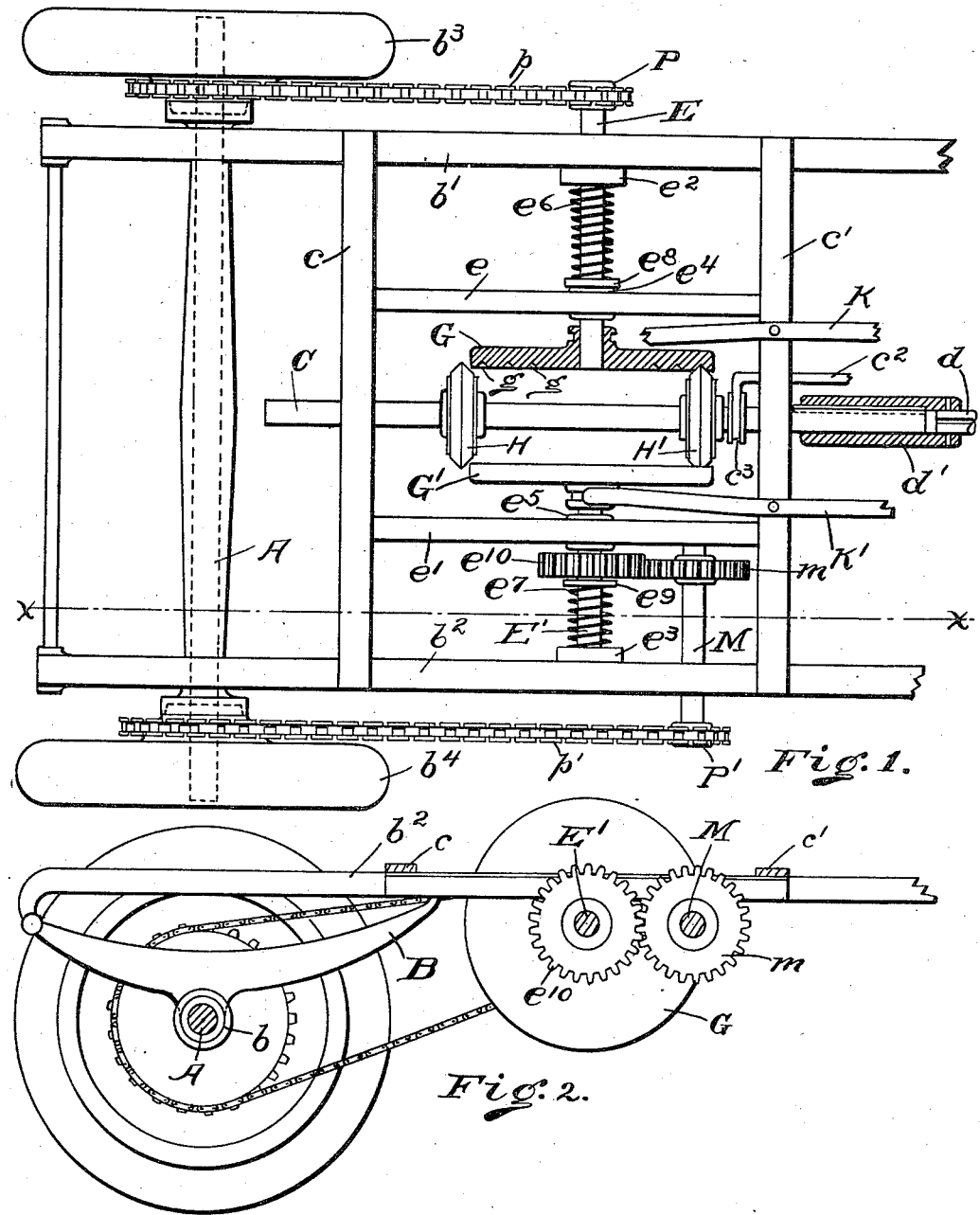

CLARENCE E. PATTON, OF CINCINNATI, OHIO, ASSIGNOR TO THE ACORN MOTOR CAR COMPANY, OF CINCINNATI, OHIO, A CORPORATION OF OHIO.

DRIVING-GEAR FOR VEHICLES.

997,636. Specification of Letters Patent. Patented July 11, 1911.

Application filed March 16, 1908. Serial No. 421,407.

*To all whom it may concern:*

Be it known that I, CLARENCE E. PATTON, a citizen of the United States of America, and resident of Cincinnati, county of Hamilton, State of Ohio, have invented certain new and useful Improvements in Driving-Gears for Vehicles, of which the following is a specification.

The object of my invention is a mechanism, in a power driven vehicle, for transmitting rotation from the engine shaft to the wheels of the vehicle, which consists of few parts and in which there is a minimum amount of loss of power in the transmission. This object is attained by the means described in the specification and illustrated in the accompanying drawings, in which, Figure 1 is a plan view of the rear wheels, the rear of the frame and of the driving gear of a vehicle embodying my invention, one of the friction disks and the sliding sleeve being shown in section. Fig. 2 is a section taken upon line $x$—$x$ of Fig. 1.

Shaft, A, is secured against rotation in the bearings, $b$, of leaf-springs, B, which are secured to the longitudinal members, $b'$, $b^2$, of the frame. The wheels, $b^3$, $b^4$, are journaled upon the ends of the shaft, A. Between the sides, $b'$, $b^2$, of the frame are two transverse bars, $c$, $c'$, in which the driving shaft, C, is centrally journaled in longitudinal alinement with the shaft, $d$, of the engine or motor, not shown. Shaft, C, is capable of a longitudinal reciprocation in its bearings in the bars, $c$, $c'$, and is splined to a sleeve, $d'$, which is secured to the shaft, $d$. The reciprocation of the shaft, C, is effected by means of a rod, $c^2$, which is secured at $c^3$, to the shaft, C, and at its opposite end may be secured to a suitable lever located adjacent to the seat of the vehicle, in easy reach of the driver thereof. Between the bars, $c$, $c'$, are secured longitudinal bars, $e$, $e'$. Members, $b'$, $b^2$, have ball-bearings, $e^2$, $e^3$, and the bars, $e$, $e'$, have bearings, $e^4$, $e^5$, in which stud shafts, E, E', are journaled. Shafts, E, E', have secured to their inner ends, friction disks, G, G'. Each friction disk has a series of concentric grooves, $g$, upon its inner face. Shaft, C, has secured upon it two friction wheels, H, H', which are beveled upon their peripheries to fit into the grooves, $g$. The distance apart of the wheels, H, H', is greater than the diameter of the largest groove, $g$, so that when one of the said wheels is engaged in the grooves, the other wheel stands beyond the peripheries of the disk, G, G'. Shafts, E, E', are mounted reciprocally in their bearings, $e^2$, $e^4$, and $e^3$, $e^5$, so that the shafts, E, E', may be moved outwardly so as to bring the disks, G, G', out of engagement with either of the wheels, H, or H'. This transverse movement of the shafts, E, E', is effected by means of arms, K, K', which are pivoted to the bar, $c'$, have their rear ends connected to the collars of the disks, G, G', and have their forward ends connected to levers, not shown, which stand in a position adjacent to the driver's seat. The disks, G, G', are held normally so as to contact the peripheries of either the wheel, H or wheel, H', by means of coiled springs, $e^6$, $e^7$. Spring, $e^6$, is mounted between bearing, $e^2$, and a collar, $e^8$, upon the shaft, E, and spring, $e^7$ is mounted between bearing $e^3$, and collar, $e^9$, upon the shaft, E'.

Journaled between the side, $b^2$, and the bar, $e'$, and adjacent to the shaft, E, is a jack-shaft, M. Shafts E' and M, have secured to them intermeshing pinions, $e^{10}$ and $m$ of the same size. The shaft, E, and the shaft, M, will therefore have rotations in the same direction and at the same speed, when the vehicle is moving in a straight line. Shaft, E, and jack-shaft, M, have upon their ends, pinions P, P', which are connected by chains, $p$, $p'$, with the vehicle wheels, $b^3$, $b^4$.

When it is desired to change either the speed or the direction of the rotation of the vehicle wheels, the friction disks, G, G', are moved apart by means of the arms, K, K', and the shaft, C, is then moved to the desired point in either direction, by moving the bar, $c^2$, and then upon the release of the arms, K, K', the springs, $e^6$, $e^7$, will return the disks, G, G', to their normal position, when the wheel, H, or H', will fit into the desired groove to give the speed and direction of rotation desired. In making this change it is seen that there are no intermeshing gears to become broken. The disks, G, G', bearing upon the wheels, H, or H', at diametrically opposite points, it is seen that there is no tortional strain put upon the shaft, C, but that this strain is normally distributed upon each side thereof. The contacting of the wheels, H, H', at diametrically opposite points, as well as the fitting of the peripheries of said wheels into the grooves in the friction disks, increases the grip between them, and in proportion, diminishes the amount of motion lost by friction.

When the vehicle is turning a corner there is enough of yielding between the friction disk adjacent to the inner vehicle wheel and its friction wheel, to permit the proper diminution in speed of the inner wheel of the vehicle to permit the change of direction.

What I claim is:

1. In a friction gearing a longitudinally shiftable driving shaft, a friction wheel mounted on said shaft and provided with a wedge-shaped driving periphery, friction disks mounted on opposite sides of said wheel and provided with concentric V-shaped grooves adapted to engage the periphery of said wheel, means for simultaneously and yieldingly holding both of said disks in operative engagement with said wheel, means for moving said disks axially to disengage said wheel, and means for transmitting rotation in the same direction from said disks.

2. In a friction gearing a longitudinally shiftable driving shaft, a friction wheel mounted on said shaft and provided with a wedge-shaped driving periphery, friction disks mounted on opposite sides of said wheel and provided with a plurality of concentric V-shaped grooves adapted to engage said wheel, a second friction wheel mounted on said driving shaft and so located as to engage both of said disks only when the first mentioned wheel is in an inoperative position relatively thereto, means for yieldingly and simultaneously holding both of said disks in operative engagement with one or the other of said wheels and means for moving said disks axially to disengage said wheel.

3. In a friction gearing, a longitudinally shiftable driving shaft, a friction wheel mounted on said shaft and provided with a wedge-shaped driving periphery, longitudinally shiftable driven shafts mounted on opposite sides of said friction wheel, a friction disk mounted on each shaft and provided with a plurality of concentric V-shaped grooves adapted to engage said wheel, a second friction wheel mounted on said driving shaft and so located as to engage both of said disks, when the first mentioned wheel is in an inoperative position relative to said disks, coiled springs surrounding said driven shafts for yieldingly and simultaneously holding both of said disks in engagement with one or the other of said wheels, and means for moving said driving shafts axially to disengage said wheels.

CLARENCE E. PATTON.

Witnesses:
 WALTER F. MURRAY,
 AGNES McCORMACK.

---

Copies of this patent may be obtained for five cents each, by addressing the "Commissioner of Patents, Washington, D. C."